US011377213B2

(12) United States Patent
Hough et al.

(10) Patent No.: US 11,377,213 B2
(45) Date of Patent: Jul. 5, 2022

(54) MODULAR LAVATORY ACCESSIBLE TO PASSENGERS OF REDUCED MOBILITY (PRM)

(71) Applicant: B/E Aerospace, Inc., Winston-Salem, NC (US)

(72) Inventors: Ray Hough, Great Denham (GB); Richard Morris, Pulloxhill (GB); Jefferey M. McKee, Duvall, WA (US); Shawn A. Claflin, Seattle, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 306 days.

(21) Appl. No.: 16/371,468

(22) Filed: Apr. 1, 2019

(65) Prior Publication Data

US 2019/0359335 A1    Nov. 28, 2019

Related U.S. Application Data

(60) Provisional application No. 62/665,975, filed on May 2, 2018.

(51) Int. Cl.
*B64D 11/02* (2006.01)
*B64D 11/00* (2006.01)
*B64D 11/04* (2006.01)

(52) U.S. Cl.
CPC .............. *B64D 11/02* (2013.01); *B64D 11/00* (2013.01); *B64D 11/0007* (2013.01);
(Continued)

(58) Field of Classification Search
CPC .. B64D 27/24; B64D 33/06; B64D 2027/026; B64D 11/02; B64D 11/04; B64D 11/06; B64C 27/08; B64C 27/20; B64C 25/04; B64C 25/06; B64C 25/34; B64C 25/36; B64C 13/04; B64C 11/001; B64C 11/44;
(Continued)

(56) References Cited

U.S. PATENT DOCUMENTS 9,114,878 B2   8/2015 Becker et al.
9,359,076 B2   6/2016 Ivester et al.
(Continued)

FOREIGN PATENT DOCUMENTS

JP    h10121754 A    5/1998

OTHER PUBLICATIONS

International Search Report and Written Opinion dated Jul. 31, 2019 for PCT/US2019/030002.
(Continued)

*Primary Examiner* — Joshua J Michener
*Assistant Examiner* — Cindi M Curry
(74) *Attorney, Agent, or Firm* — Suiter Swantz pc llo

(57) ABSTRACT

An aircraft lavatory complex incorporating lavatories accessible to passengers of reduced mobility (PRM) is disclosed. Left-side and right-side full service lavatory units are accessible via left-side and right-side lavatory access doors opening in opposing directions. The left-side and right-side full service lavatory units are separated by a common central partition repositionable by cabin crewmembers (but protected from independent repositioning by occupants of either lavatory unit) to enlarge either of the left-side or right-side lavatory units for enhanced PRM accessibility.

16 Claims, 10 Drawing Sheets

(52) U.S. Cl.
CPC ...... *B64D 11/0015* (2013.01); *B64D 11/0023* (2013.01); *B64D 11/04* (2013.01); *B64D 2011/0046* (2013.01)

(58) Field of Classification Search
CPC ... E04B 1/343; E04B 1/34357; E04B 1/34384
USPC .. 52/284, 285.1, 285.2, 285.3, 285.4, 582.2, 52/238.1, 239, 243.1, 36.4, 36.1, 64; 292/148, 104
See application file for complete search history.

(56) References Cited

U.S. PATENT DOCUMENTS

| | | | |
|---|---|---|---|
| 9,714,094 B2 | 7/2017 | Ivester et al. | |
| 9,862,491 B2 | 1/2018 | McKee et al. | |
| 10,232,942 B2 | 3/2019 | McKee | |
| 2009/0261200 A1* | 10/2009 | Saint-Jalmes | B64D 11/0691 244/118.5 |
| 2011/0101160 A1 | 5/2011 | Gomes et al. | |
| 2013/0001359 A1 | 1/2013 | Schliwa et al. | |
| 2014/0125092 A1* | 5/2014 | Schreuder | B64D 11/04 297/163 |
| 2014/0217239 A1 | 8/2014 | Ehlers et al. | |
| 2014/0224930 A1 | 8/2014 | Ivester et al. | |
| 2014/0291446 A1 | 10/2014 | Reams et al. | |
| 2014/0339360 A1* | 11/2014 | Moje | B64D 11/04 244/118.5 |
| 2014/0339363 A1* | 11/2014 | Moje | B64D 11/02 244/118.5 |
| 2015/0007600 A1 | 1/2015 | Godecker et al. | |
| 2015/0069180 A1 | 3/2015 | Brunaux et al. | |
| 2015/0096118 A1 | 4/2015 | McIntosh | |
| 2015/0136903 A1* | 5/2015 | Schliwa | B64D 11/02 244/118.5 |
| 2015/0360782 A1 | 12/2015 | Jin et al. | |
| 2016/0039522 A1* | 2/2016 | Koyama | B64D 11/02 244/118.5 |
| 2016/0167784 A1* | 6/2016 | Schliwa | B64D 11/04 244/118.6 |
| 2017/0021929 A1* | 1/2017 | McKee | B64D 11/0691 |
| 2017/0283059 A1 | 10/2017 | McKee | |
| 2017/0370630 A1* | 12/2017 | Klassen | F25D 15/00 |
| 2018/0016008 A1* | 1/2018 | Payne | B64D 13/06 |
| 2018/0208314 A1 | 7/2018 | Heidtmann et al. | |
| 2019/0308728 A1 | 10/2019 | McKee | |
| 2019/0359336 A1* | 11/2019 | Hough | B64D 11/0023 |

OTHER PUBLICATIONS

Doyle, Christopher, "A321 Forward Attendant Station". In Wikimedia Commons [online], Jul. 12, 2008 17:12 [retrieved on Jun. 17, 2019], Retrieved from the Internet: <URL: https://commons.wikimedia.org/wiki/File:A32X_Forward_Attendant_Station.jpg>.
Examination Report for European Application No. 19207505.9 dated Oct. 29, 2020, 4 pages.
International Search Report dated Jul. 31, 2019 for PCT/US2019/030002.
Extended Search Report in European Application No. 19795772.3 dated Jan. 21, 2022, 7 pages.

* cited by examiner

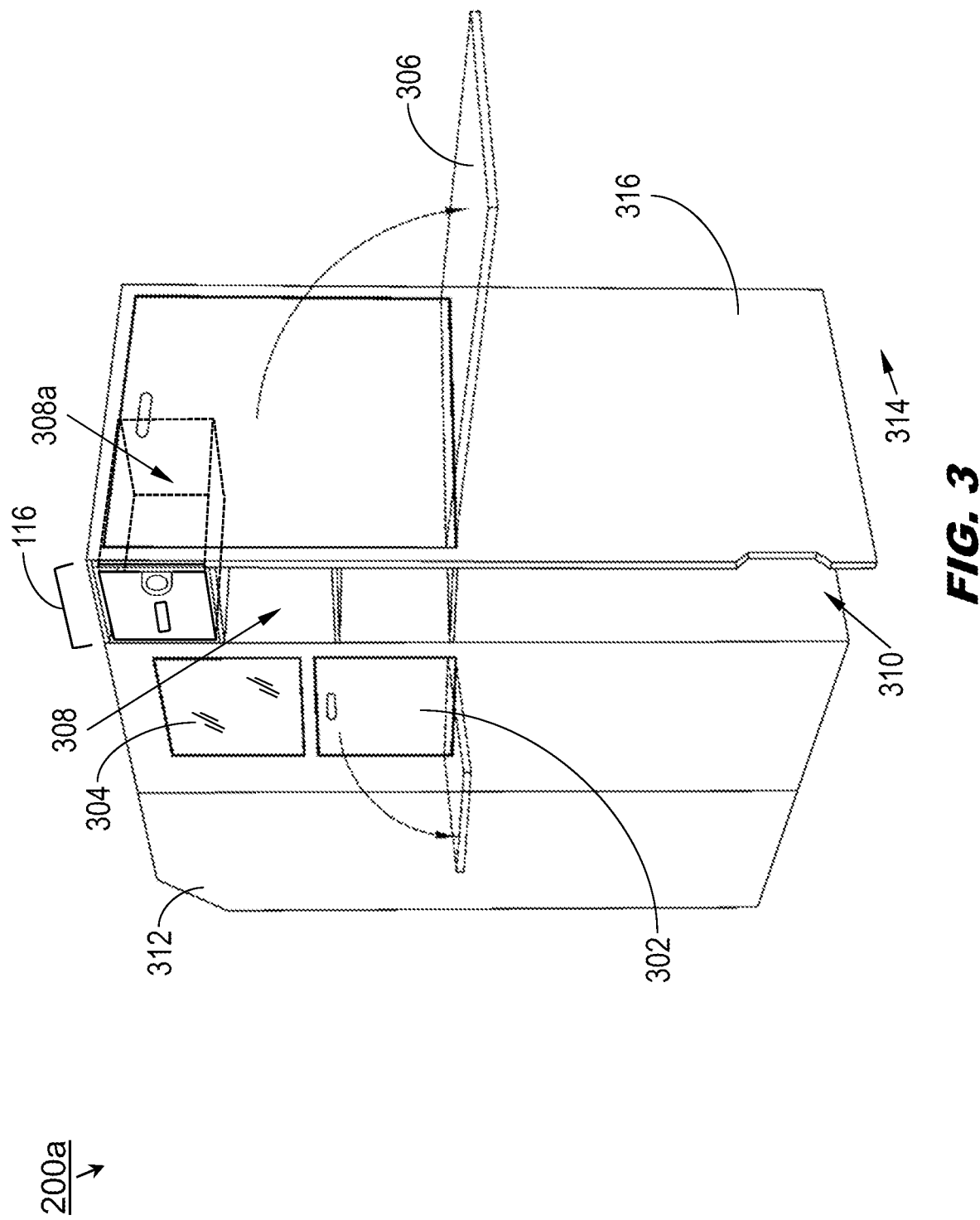

700

702 — Creating an entry space by accessing a first lavatory unit via a first door and a second lavatory unit via a second door, the second lavatory unit directly adjacent to the first lavatory unit and separated from the first lavatory unit by a partition at least partially within the entry space 704 — Unlatching a first latch from the first lavatory unit, the first latch coupling the partition to the first lavatory unit 706 — Unlatching a second latch from the second lavatory unit, the second latch coupling the partition to the second lavatory unit 708 — Enlarging the first lavatory unit by repositioning the partition to obscure a portion of the second lavatory unit

MODULAR LAVATORY ACCESSIBLE TO PASSENGERS OF REDUCED MOBILITY (PRM)

CROSS-REFERENCE TO RELATED APPLICATIONS

The instant application claims priority under 35 U.S.C. § 119(e) to provisional U.S. Patent Application Ser. No. 62/665,975, filed May 2, 2018. The instant application is also related to concurrently filed and commonly owned U.S. patent application Ser. No. 16/371,441. Said U.S. patent applications Ser. Nos. 62/665,975 and 16/371,441 are herein incorporated by reference in their entirety.

BACKGROUND

Widebody passenger aircraft may incorporate a main galley aft of the main passenger cabin. Additional galley space (e.g., for preparation or climate-controlled storage of food and beverages) may be situated throughout the cabin. The main galley space may extend in a rough V-shape around the aft end of the passenger cabin. The galley complex may be oversized relative to auxiliary galley facilities, leading to excess traffic in the rear aisles associated with inflight catering and service operations. At the same time, said widebody aircraft may position passenger lavatories generally forward and amidships rather than aft of the cabin, encroaching upon the cabin space available for passenger seating. As this cabin space is both limited and highly valuable, lavatory arrangements may prioritize compactness above all. While the configuration of said lavatories may make efficient use of limited cabin space, they may not be optimal for use by passengers of reduced mobility (PRM) who may require additional space to comfortably enter, exit, or use the lavatory facilities.

SUMMARY

An aircraft lavatory complex incorporating a lavatory accessible to passengers of reduced mobility (PRM) is disclosed. In embodiments, the aircraft lavatory complex includes a forward wall facing the passenger cabin with left-side and right-side lavatory access doors set thereinto, the left-side and right-side doors opening in opposing directions. Left-side and right-side full service lavatory units are respectively accessible via the left-side and right-side doors, separated by a common central partition. The central partition is repositionable to enlarge either of the left-side or right-side lavatory units for enhanced PRM accessibility.

In embodiments, the lavatory complex is incorporated into a galley structure of the aircraft (or a group of interconnected galley structures) and has an aft wall facing into the galley structure (or into the galley workspace enclosed thereby).

In embodiments, the aircraft lavatory complex includes a workdeck capable of folding down from the aft wall into a horizontal orientation within the interior galley workspace.

In embodiments, the aircraft lavatory complex includes an interactive display unit, such as a video monitor, flight attendant panel, or inflight entertainment unit, set into the aft wall for use within the galley structure.

In embodiments, the aircraft lavatory complex includes galley storage bays set into the aft walls and configured to accept galley standard unit containers.

In embodiments, the aircraft lavatory complex includes a trolley bay set into the aft wall and capable of removably securing a trolley within the bay.

In embodiments, the central partition enlarges either the left-side or right-side lavatory unit by obscuring a portion of the other lavatory unit.

In embodiments, both lavatories include individual toilets and sinks, and the central partition deploys to obscure the toilet, but not the sink, of the opposing (non-enlarged) lavatory unit.

In embodiments, the central partition is held in its default position by at least two latches coupling the partition to the aircraft lavatory complex, the two latches operable (one latch operable from the left-side lavatory unit and one latch operable from the right-side lavatory unit) to reposition the central partition in its deployed position.

In embodiments, the central partition may be temporarily removed from the aircraft lavatory complex to unite the left-side and right-side lavatory units into a single space.

A method for reconfiguring an aircraft lavatory complex for use by a passenger of reduced mobility (PRM) is also disclosed. In embodiments, the method includes creating an entry space for the PRM by accessing a left-side lavatory unit of the complex via a left-side entry door and a right-side lavatory unit via a right-side entry door, the left-side and right-side lavatory units directly adjacent and separated by a central partition. In embodiments, the method includes operating a first latch from the left-side lavatory unit and a second latch from the right-side lavatory unit, the latches securing the central partition within the aircraft lavatory complex. In embodiments, the method includes enlarging either the left-side or right-side lavatory unit by repositioning the unlatched central partition.

In embodiments, the method includes opening the left-side entry door to the left-side lavatory unit in a leftward direction and opening the right-side entry door to the right-side lavatory unit in a rightward direction.

In embodiments, the method includes repositioning the central partition to obscure a portion of the opposing lavatory unit.

In embodiments, the method includes repositioning the central partition to obscure the toilet of the opposing (e.g., non-enlarged) lavatory unit.

In embodiments, the method includes operating the left-side and right-side latches to decouple the central partition from a common floor shared by the left-side and right-side lavatory units.

In embodiments, the method includes temporarily removing the central partition to combine the left-side and right-side lavatory units into a single space.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 3 is an aft isometric view of the aircraft lavatory complex of FIG. 2;

FIG. 7 is a flow diagram illustrating a method for reconfiguring the aircraft lavatory complex of FIG. 2 for use by passengers with reduced mobility (PRM) in accordance with example embodiments of this disclosure.

DETAILED DESCRIPTION

Figure 1:
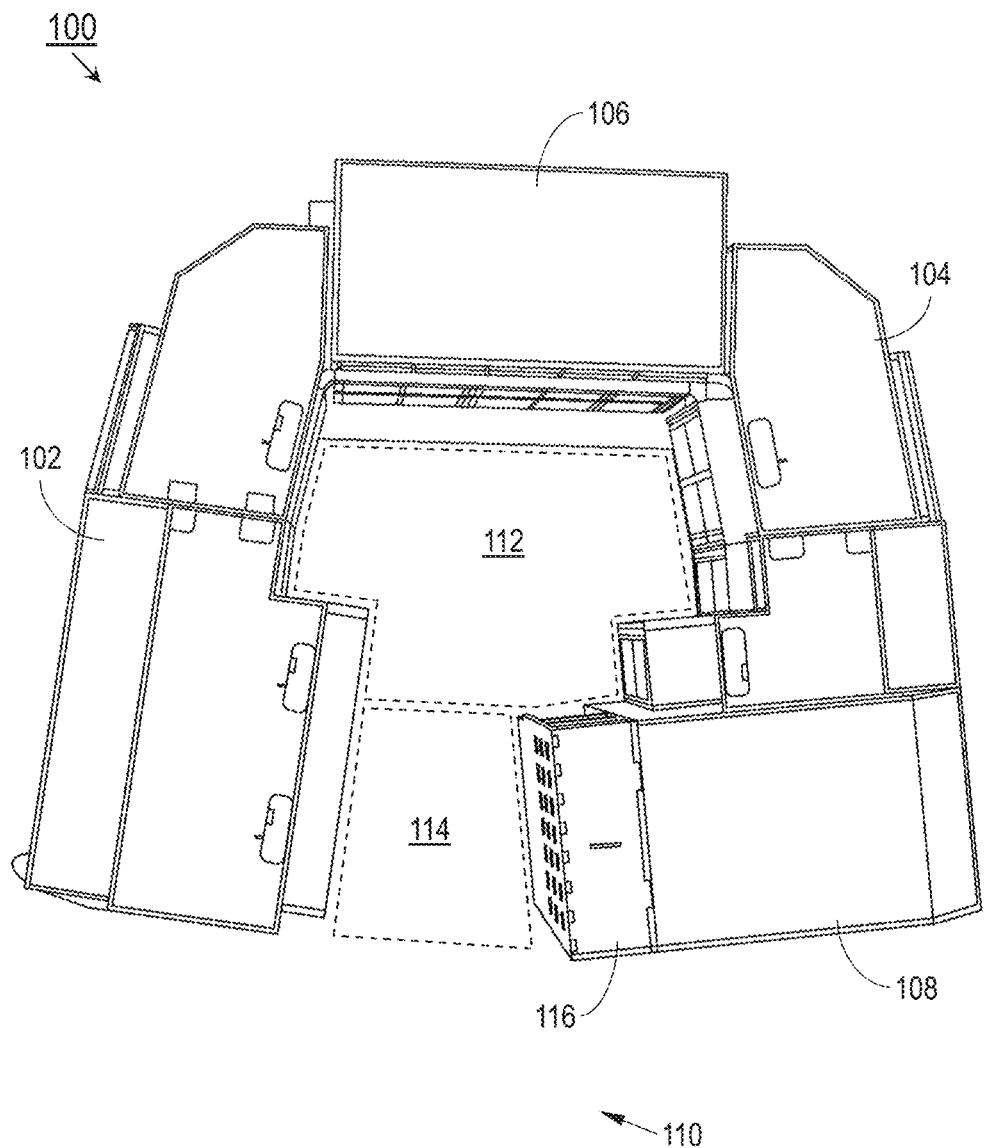
FIG. 1 is an overhead view of an aircraft aft galley/lavatory complex, in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

An aft aircraft lavatory complex accessible to passengers of reduced mobility (PRM) is disclosed. The lavatory complex provides two standard-sized lavatories which may be temporarily converted into a larger interior space for the use of passengers who may have trouble using conventional aircraft lavatory facilities, e.g., due to the difficulty of using assistive equipment within compact lavatory spaces. Further, the lavatory complex may be incorporated into an aft galley complex, providing additional storage and functional space for galley operations.

Referring to FIG. 1, a modular aft galley/lavatory complex 100 for an aircraft in accordance with example embodiments of this disclosure may include a group of interconnected galley structures, e.g., a left-side galley structure 102, a right-side galley structure 104, and an aft galley structure 106 connecting the left-side and right-side galley structures. The right-side galley structure 104 may incorporate a lavatory complex 108 accessible from the aircraft passenger cabin 110. In some embodiments, the lavatory complex 108 may be incorporated into the left-side galley structure 102 (e.g., relative to the aft galley/lavatory complex 100).

In embodiments, the aft galley/lavatory complex 100 may be situated at the aft terminus of the passenger cabin 110, such that the left-side galley structure 102 extends substantially forward along the starboard side of the aircraft and the right-side galley structure 104 (e.g., relative to the aft galley/lavatory complex 100) extends substantially forward along the port side of the aircraft. Accordingly, the aft galley/lavatory complex 100 may be situated aft of the rearmost passenger egress door.

In embodiments, the aft galley/lavatory complex 100 may be connected to onboard supplies of electrical power and potable water as well as onboard communications or computing networks. Similarly, the aft galley/lavatory complex 100 may be connected to vacuum lines, pipes, or ducting systems, e.g., for draining waste water from sinks and toilets, ventilating the lavatory complex 108, or removing under suction solid and liquid waste products from the lavatory complex for secure and sanitary inflight storage.

The aft galley/lavatory complex 100 may include an interior galley workspace 112 partially enclosed by the left-side galley structures 102, the right-side galley structures 104, and the aft galley structures 106. For example, crewmembers may access the galley workspace 112 from the passenger cabin 110 via a central aisle 114. From the galley workspace 112, crewmembers may use or access storage spaces, worksurfaces, galley inserts, and trolleys situated within the galley structures. In embodiments, the lavatory complex 108 may include a galley extension 116 providing additional storage space.

Figure 2:
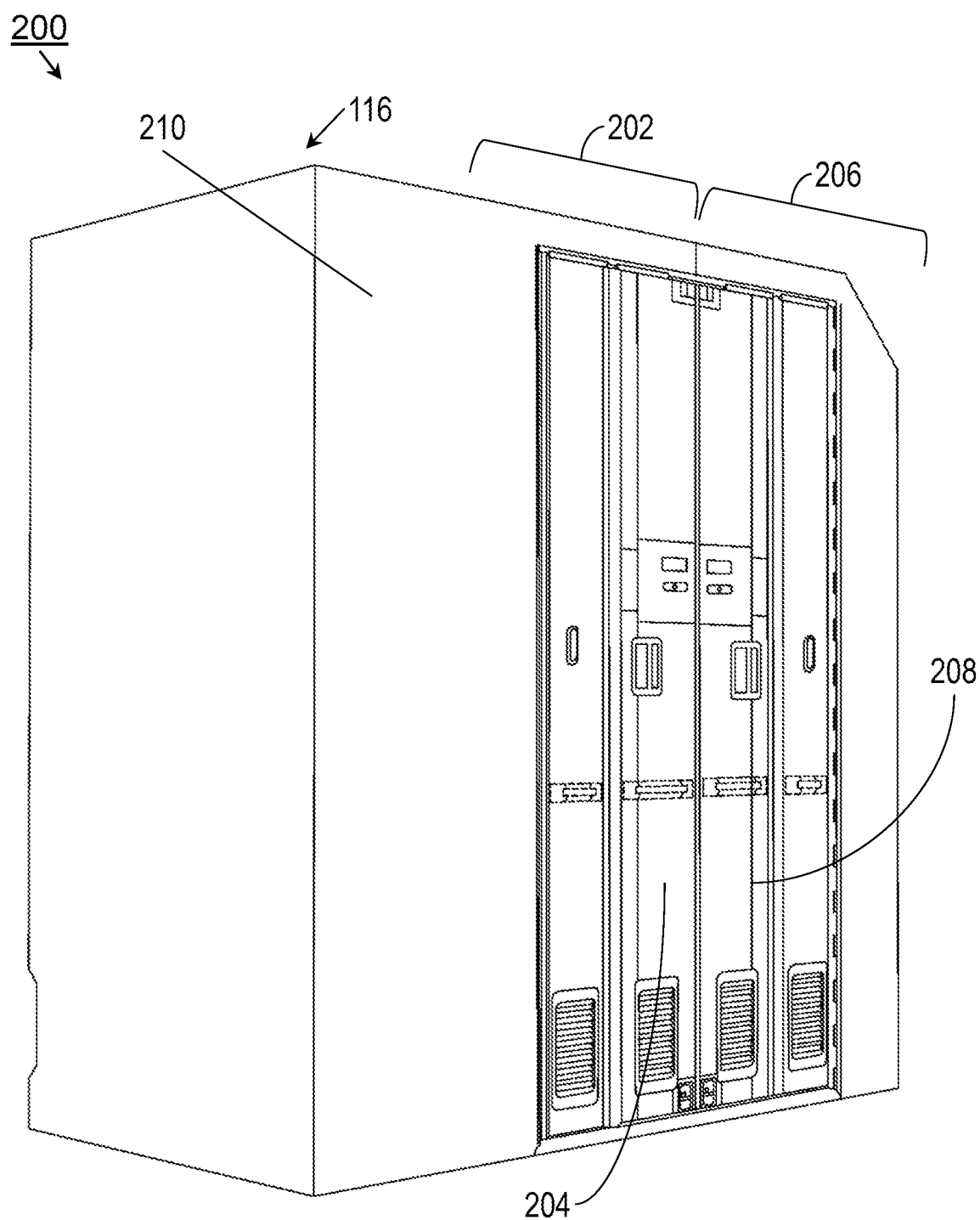
FIG. 2 is a forward isometric view of an aircraft lavatory complex accessible to passengers of reduced mobility (PRM) of the aft galley/lavatory complex of FIG. 1.

Referring to FIG. 2, an aircraft lavatory complex 200 is disclosed. The aircraft lavatory complex 200 may be implemented and may function similarly to the lavatory complex 108 and the galley extension 116 of FIG. 1, except that the aircraft lavatory complex 200 may include a left-side lavatory unit 202 accessible via a left-side entry door 204 and a right-side lavatory unit 206 accessible via a right-side entry door 208, the left-side and right-side entry doors set into a forward wall 210.

In some embodiments, the aircraft lavatory complex 200 may be incorporated into or attached to the aft galley/lavatory complex 100 of FIG. 1, the left-side entry door 204 and right-side entry door 208 opening into an aisle space proximate to, or aft of, the rearmost passenger door on either the port or starboard side of the aircraft.

In embodiments, the galley extension 116 may provide additional storage or functional space for use in conjunction with the aft galley/lavatory complex 100.

Referring now to FIG. 3, the aircraft lavatory complex 200a may be implemented and may function similarly to the aircraft lavatory complex 200 of FIG. 2, except that the aircraft lavatory complex 200a may include one or more of a deployable workdeck 302, an interactive panel 304, a deployable counter 306, a storage bay 308, and a trolley bay 310.

In embodiments, the aircraft lavatory complex 200a may be attached to, or incorporated into, the aft galley/lavatory complex 100 of FIG. 1. For example, the aircraft galley complex 200a may have a rear wall 312 (opposite the forward wall 210 as shown by FIG. 2, into which the left-side entry door 204 and right-side entry door 208 may be set) facing into the aft galley/lavatory complex 100, or into the interior galley workspace (112, FIG. 1) defined and partially enclosed by the interconnected galley structures (102, 104, 106; FIG. 1).

In embodiments, the rear wall 312 may incorporate a deployable workdeck 302 capable of folding down into a substantially horizontal worksurface for temporary use, e.g., during inflight catering or food preparation operations.

In embodiments, the rear wall 312 may incorporate an interactive panel 204 or display unit for use by cabin crewmembers within the aft galley/lavatory complex 100. For example, the interactive panel 304 may incorporate a touch-sensitive flight attendant panel (FAP) or video monitor capable of providing a direct view of portions of the passenger cabin (110, FIG. 1) not directly visible to crewmembers within the aft galley/lavatory complex 100. Similarly, the FAP may provide crewmembers with lighting and ventilation controls for the passenger cabin 110 or particular zones thereof, or alert the crewmembers to calls from individual seats. In some embodiments, the interactive panel 304 may provide inflight entertainment (IFE) content.

In embodiments, the galley extension 116 may provide additional space and functionality to the aft galley/lavatory complex 100. For example, the galley extension 116 may incorporate one or more storage bays 308 accessible from within the interior galley workspace 112 or from the passenger cabin 110 outside the aft galley/lavatory complex 100. The storage bays 308 may be sized to accommodate galley standard unit containers 308a. Similarly, the lower level of the galley extension 116 may incorporate a trolley bay 310 capable of securing therewithin a standard size trolley (e.g., galley cart). For example, the trolley may be stored within the trolley bay 310 during takeoff and climb operations and released from the trolley bay (and wheeled around the passenger cabin) for in-seat catering and food-service operations inflight, e.g., once the aircraft has reached cruising altitude.

In embodiments, the aircraft lavatory complex 200a may be incorporated into the aft galley/lavatory complex 100 on either the port or starboard side of the aircraft, separated from the opposite side of the aft galley/lavatory complex by a center aisle through which cabin crew may access the interior galley workspace 112 from the passenger cabin 110. For example, the aircraft lavatory complex 200a may have a side wall 316 facing into the center aisle 314. A deployable counter 306 may be set into the side wall 316 and capable of folding down into a substantially horizontal position across the center aisle 314, providing a barrier between passengers and the interior galley workspace 112. Cabin crewmembers may additionally or alternatively use the deployable counter 306 to serve food and beverages to passengers congregating in the vicinity of the aircraft lavatory complex 200a. In some embodiments, the side wall 316 may incorporate (e.g., instead of the storage bays 308, and/or revealed by the deployment of the deployable counter 306) a self-service compartment stocked with refreshments which passengers congregating in the vicinity of the aircraft lavatory complex 200a may select. For example, the self-service compartment may be a chilled or otherwise climate-controlled compartment, e.g., wherein beverages are stored at a desired temperature.

In some embodiments, the storage bays 308 may include galley insert (GAIN) bays configured to accept beverage makers, waste bins, trash compactors, ovens, chillers, and other galley insert devices. For example, the galley insert bays may incorporate interfaces capable of supplying the galley insert devices with operating power while receiving data from the devices, e.g., power allocation requests, usage data, or diagnostics. In some embodiments, the trolley bay 310 may be configured for temporary storage of wheelchairs and other assistive equipment (e.g., by PRM using the aircraft lavatory complex 200a). For example, the trolley bay 310 may be accessible from the passenger cabin and incorporate fasteners or other means of securing a wheelchair within the trolley bay while the aircraft is at a safe cruising altitude.

Figure 4A:
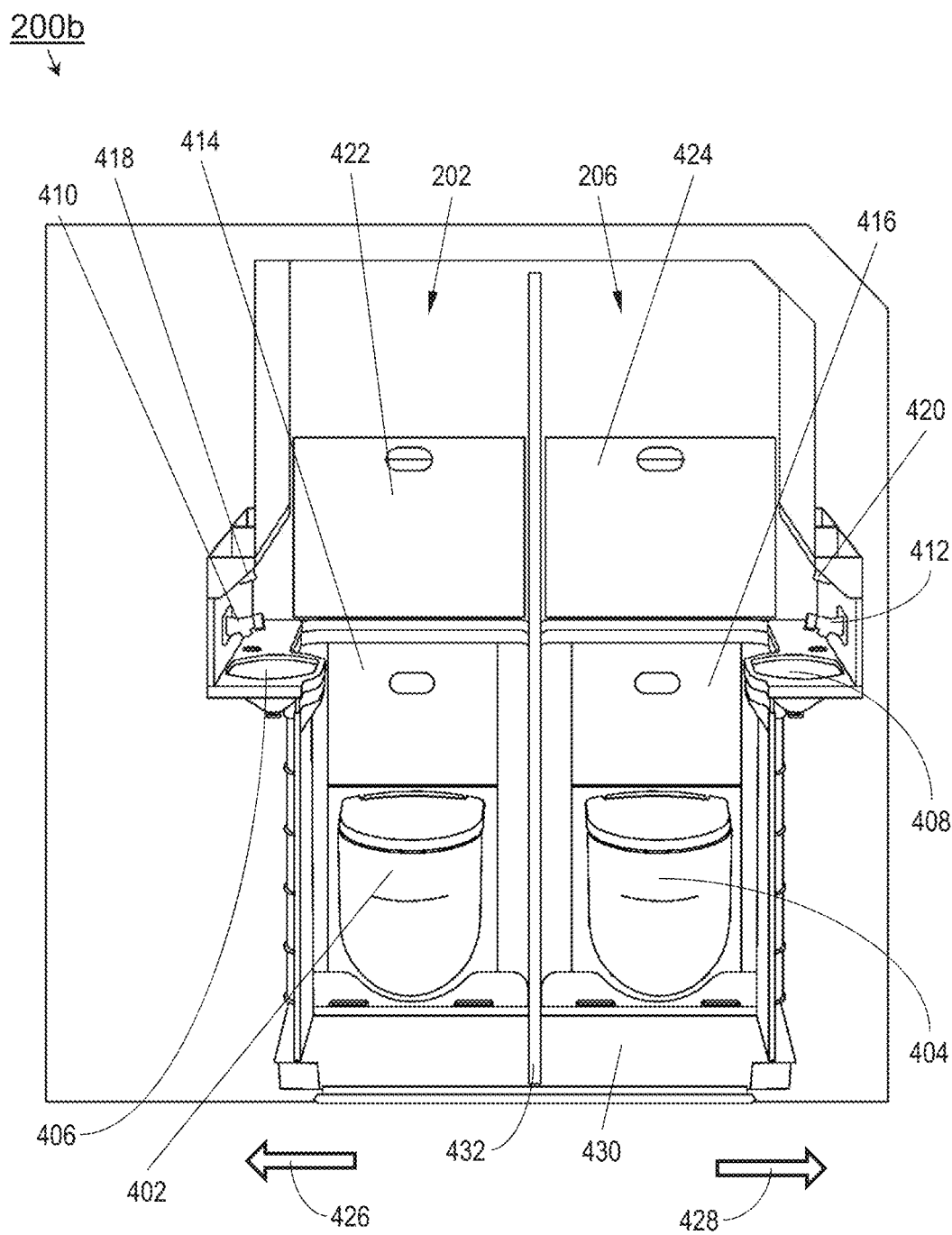
FIGS. 4A and 4B are respectively a forward partial view and an overhead partial view of the aircraft lavatory complex of FIG. 2.
Figure 4B:
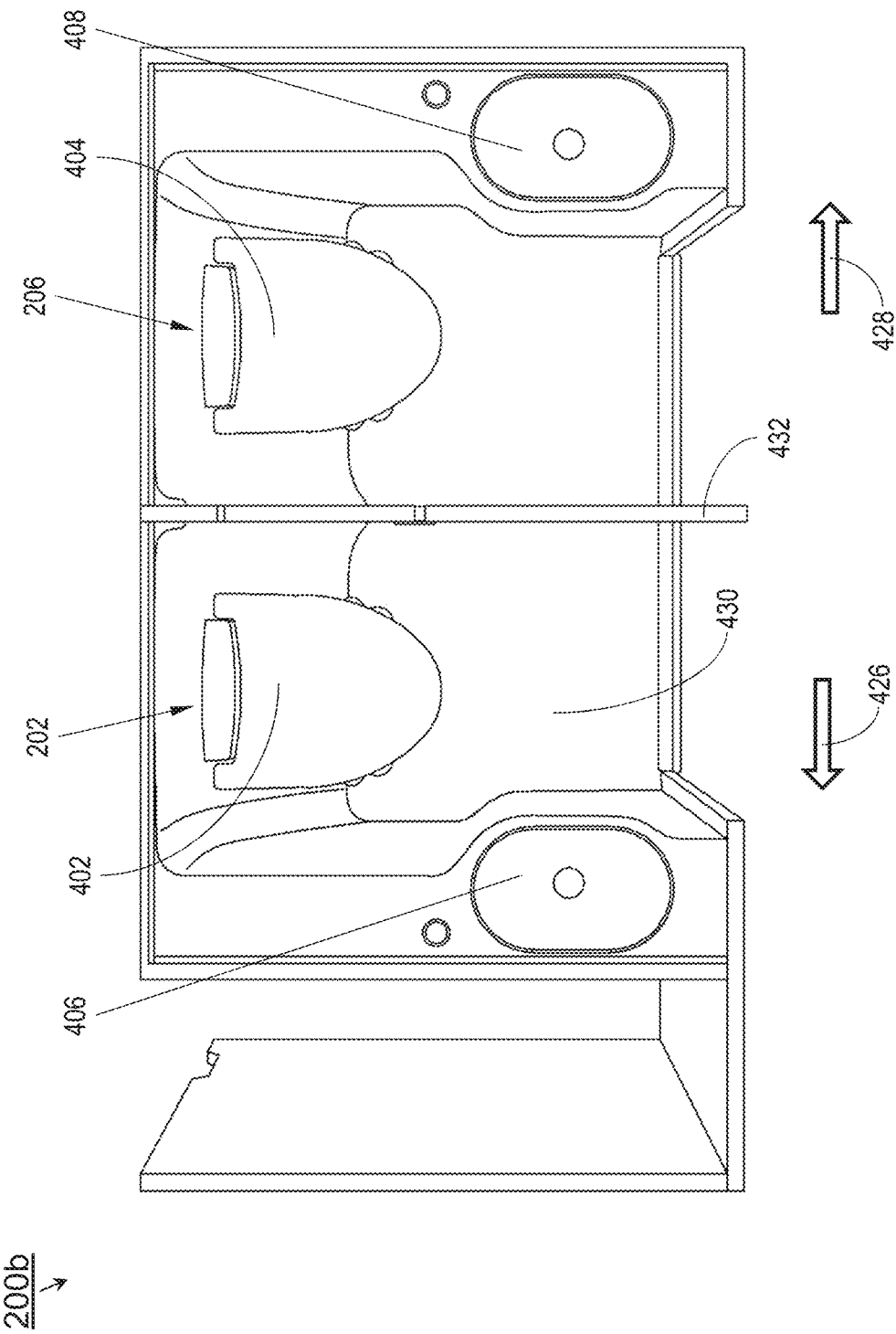

Referring now to FIGS. 4A and 4B, the aircraft lavatory complex 200b may be implemented and may function similarly to the aircraft lavatory complex 200a of FIG. 3, except that the individual lavatory units 202, 206 within the aircraft lavatory complex 200b may include toilets 402, 404; sinks 406, 408; faucets 410, 412; waste receptacles 414, 416; lighting fixtures 418, 420; and fold-down changing tables 422, 424.

In embodiments, the left-side and right-side entry doors (204, 208; FIG. 2) may be opened in opposing directions (426, 428) to access the respective individual lavatory units 202, 206 and the facilities and amenities included therein. The individual lavatory units 202, 206 may share a common floor 430 but may be separated by a central partition 432 to preserve each individual lavatory unit as a private space. Each individual lavatory unit 202, 206 may further be connected to aircraft ventilation systems (e.g., to provide ventilation and exhaust), water supplies (e.g., to provide water to the faucets 410, 412 and drain waste water), plumbing or vacuum systems (e.g., to drain solid and liquid waste products from the toilets 402, 404), and power supplies (e.g., for lighting fixtures 418, 420 or plug-in charging of electric devices).

Figure 5A:
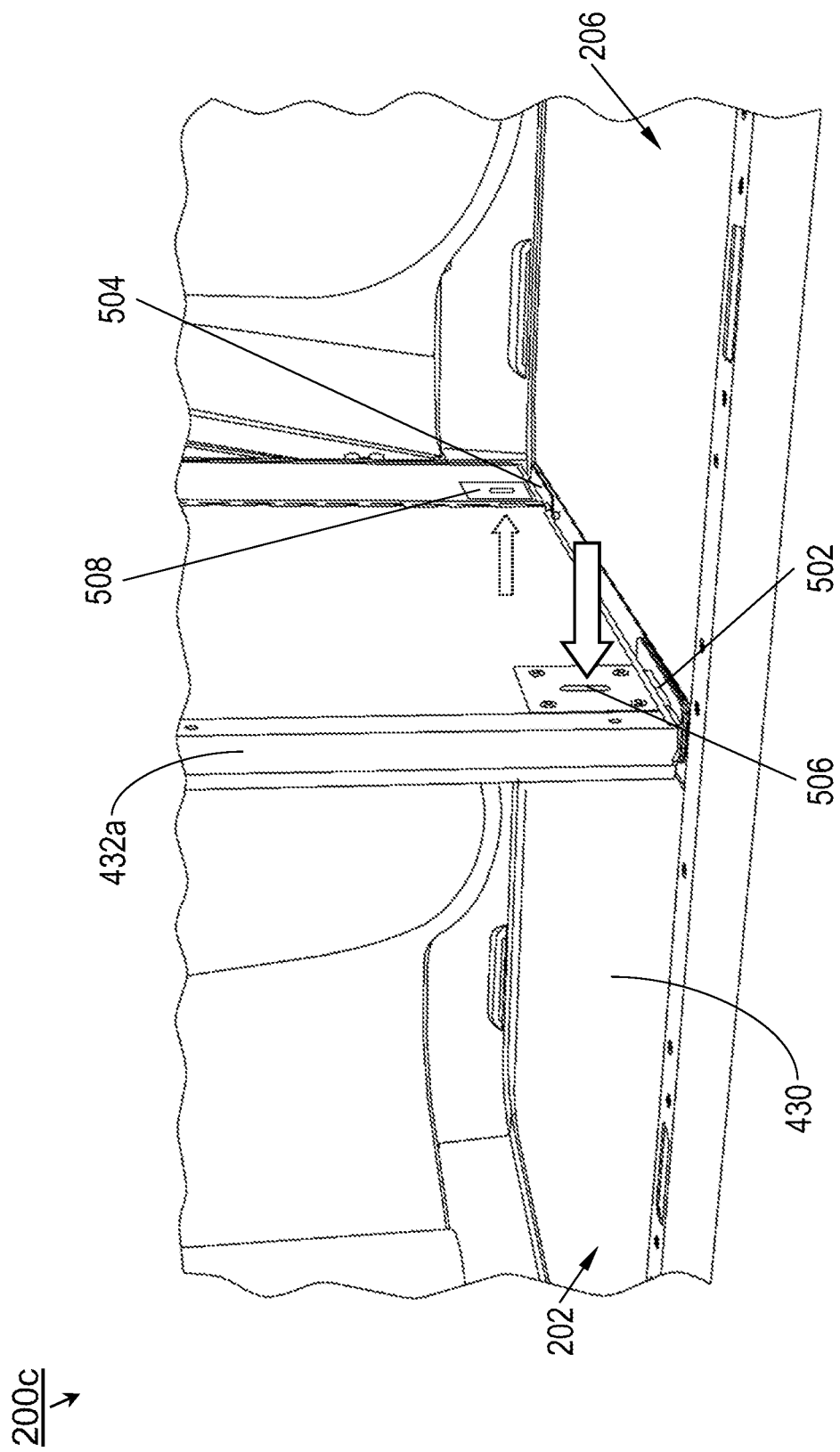
FIGS. 5A and 5B are respectively forward and overhead views of a repositionable partition of the aircraft lavatory complex of FIG. 2.
Figure 5B:
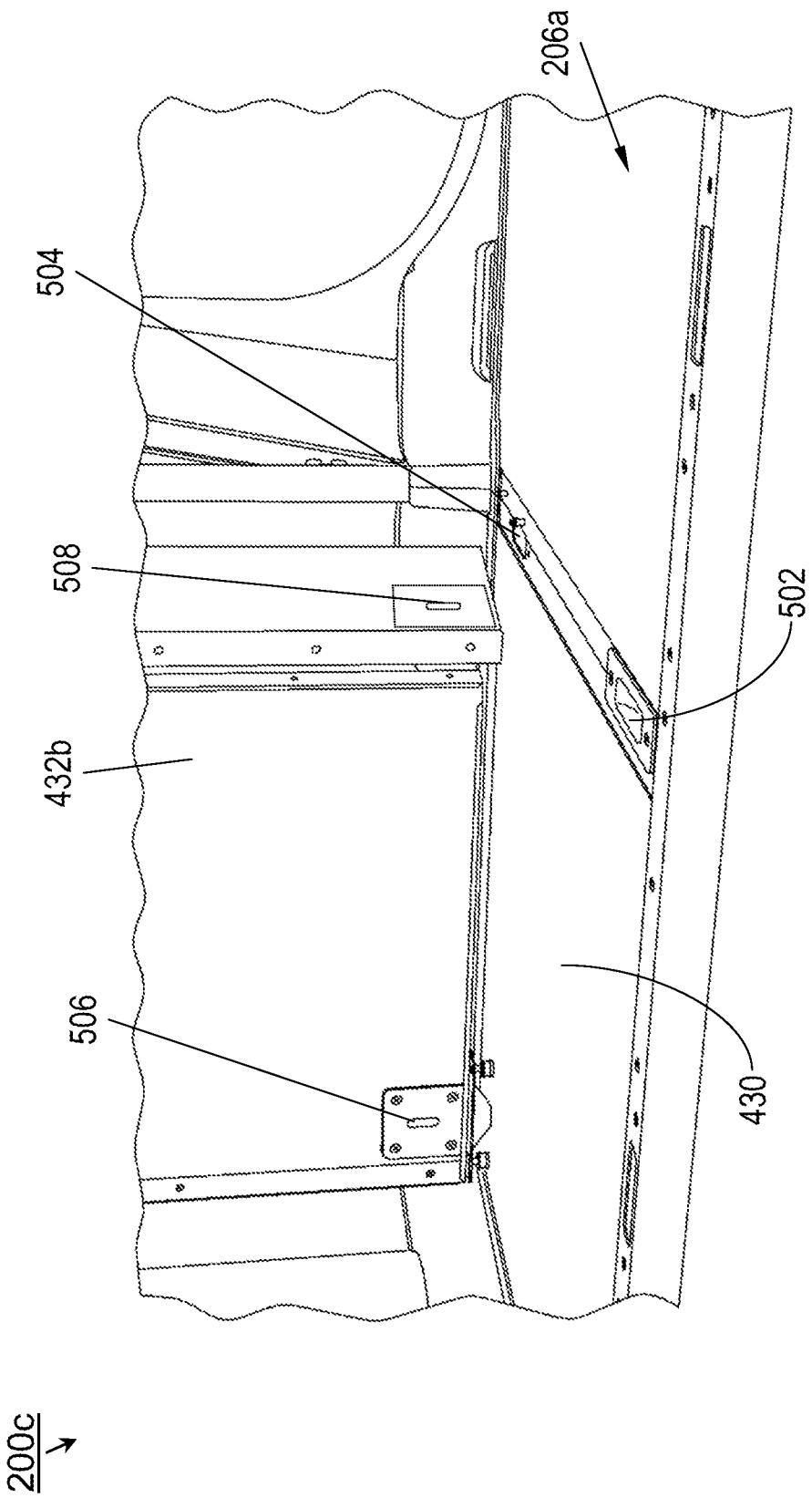

Referring now to FIGS. 5A and 5B, the aircraft lavatory complex 200c may be implemented and may function similarly to the aircraft lavatory complex 200b of FIGS. 4A and 4B, except that the central partition 432a of the aircraft lavatory complex 200c may be repositioned (432b) by cabin crewmembers, e.g., to temporarily create a larger space within the aircraft lavatory complex (200b, FIGS. 4A/B) and render the aircraft lavatory complex more accessible to passengers of reduced mobility (PRM) who may otherwise have difficulty using the individual lavatory units (202, 206; FIGS. 4A/B).

In embodiments, the central partition 432a may be secured to the floor 430 of the aircraft lavatory complex 200c by a series of latches (502, 504; e.g., mechanical latches, magnetic catches, or any other appropriate type of fastener) such that the central partition may not be unfastened from the floor solely from either individual lavatory unit 202, 206, or without the use of specialized tools available to cabin crewmembers. Thus, a passenger using either individual lavatory unit 202, 206 cannot compromise the privacy of the opposing individual lavatory unit, whether or not said opposing unit is currently occupied.

For example, a PRM wishing to utilize the aircraft lavatory complex 200c (e.g., the aircraft lavatory complex being otherwise unoccupied) may contact a crewmember. The crewmember may release the central partition 432a from the floor 430 by inserting a specialized tool into a slot 506 from the individual lavatory unit 206 to actuate the latch 502. Similarly, the crewmember must also actuate the latch 504 via a similar slot 508 accessible from the individual lavatory unit 202. In some embodiments, the central partition 432a may similarly, or alternatively, be secured to (and must therefore be released from) the ceiling of the aircraft lavatory complex 200c by a similar series of releasable latches or catches (not shown).

Referring in particular to FIG. 5B, once the central partition 432a is released from the floor 430, the central partition may be repositioned (432b) to enlarge the available space within the individual lavatory unit (206a) for use by a PRM. For example, the central partition 432b may be repositioned within the opposing individual lavatory unit 202, partially or fully impeding the usage of the opposing individual lavatory unit 202 and its component facilities. In some embodiments, the central partition 432a may alternatively be repositioned within the individual lavatory unit 206 to enlarge the individual lavatory unit 202. In some embodiments, the repositioned central partition 432b may be temporarily secured to the floor 430 or the ceiling of the aircraft lavatory complex 200c in its repositioned orientation (e.g., via the latches 502/504, the slots 506/508, and the corresponding tool). In embodiments, the central partition 432a may pivot or slide into a deployed position (432b); in some embodiments, the central partition 432a may be fully detachable or removable from the aircraft lavatory complex 200c, temporarily combining the individual lavatory units 202, 206 into a single accessible space. In embodiments, the operation of the left-side and right-side entry doors (204, 208; FIG. 2) would not be impeded by the repositioning or removal of the central partition 432a.

Figure 6A:
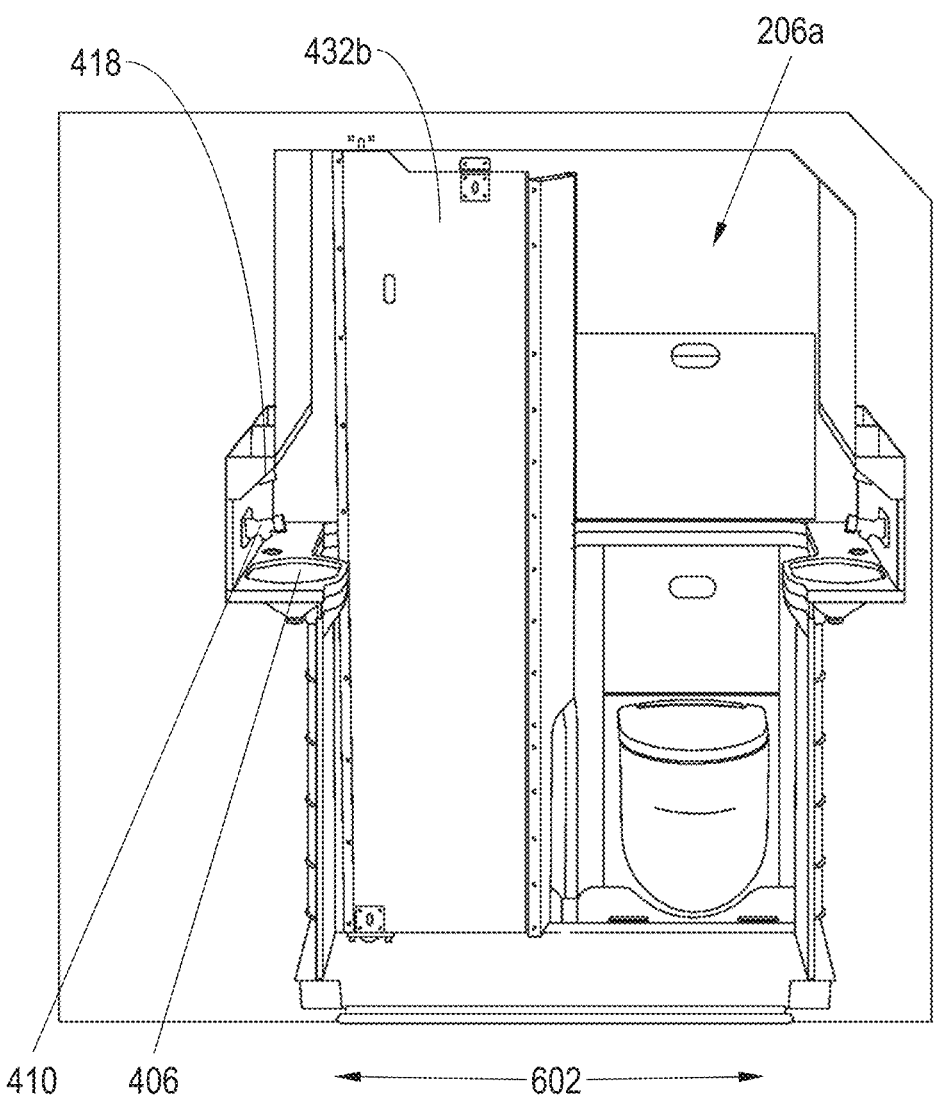
FIGS. 6A and 6B are respectively a forward partial view and an overhead partial view of the aircraft lavatory complex of FIG. 2 subsequent to the operations of FIG. 5B.
Figure 6B:
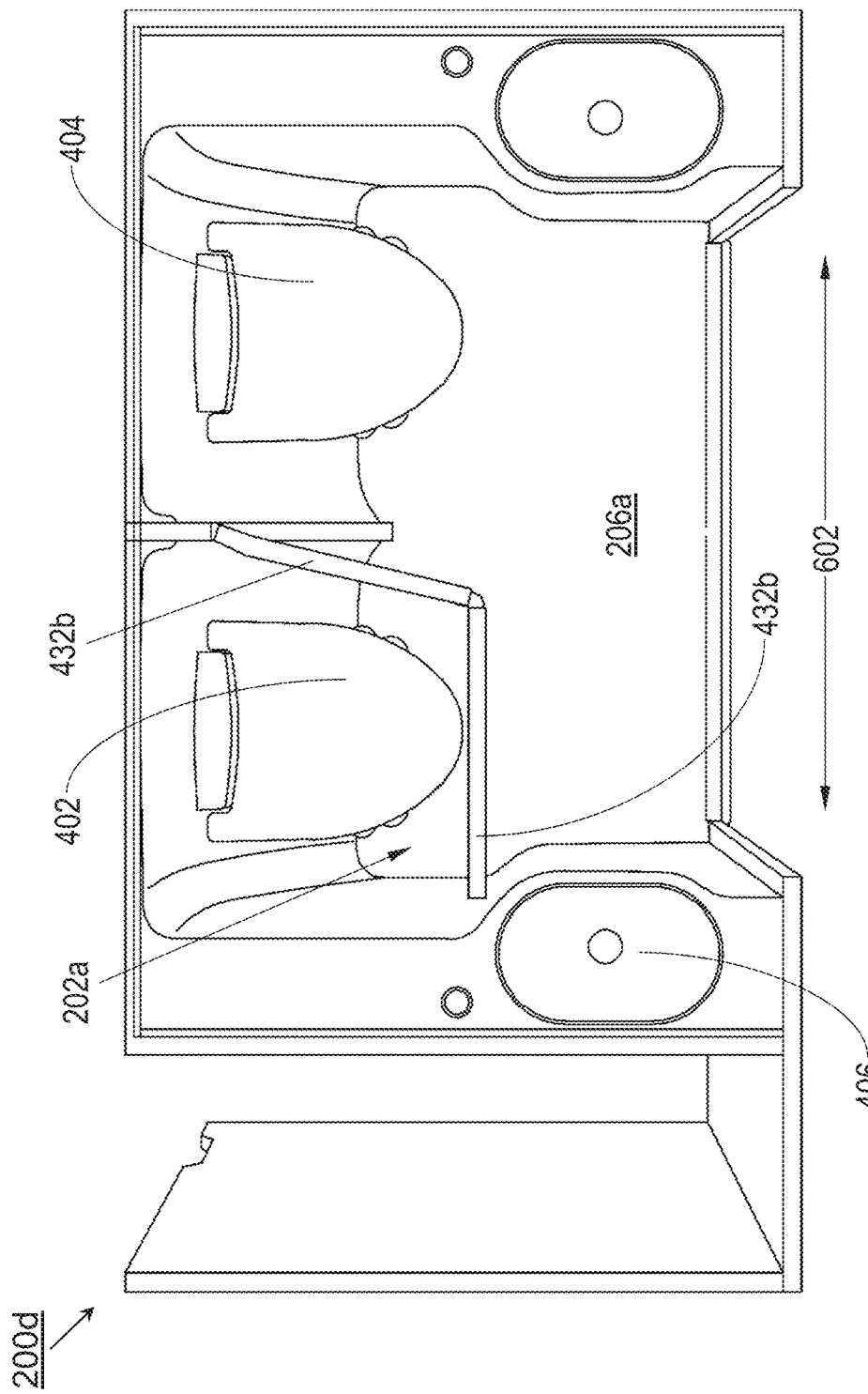

Referring now to FIGS. 6A and 6B, the aircraft lavatory complex 200d may be implemented and may function similarly to the aircraft lavatory complex 200c of FIGS. 5A and 5B, except that the repositioned central partition 432b of the aircraft lavatory complex 200d, while enlarging the available space of the individual lavatory unit (206a) for PRM use, may impede the use of some, but not all, facilities of the opposing individual lavatory unit (202a).

For example, the repositioned central partition 432b may obscure the toilet 402 (but not the faucet 410, sink 406, or lighting fixture 418) of the individual lavatory unit (202a). In some embodiments, the central partition 432b may further include assistive grips, rails, or handles to facilitate use of the enlarged individual lavatory unit 206a by the PRM. In addition, the repositioning of the central partition 432b may result in a single enlarged entry/egress space (602) into the enlarged individual lavatory unit 206a behind the left-side and right-side entry doors (204, 208; FIG. 2) without interfering with opening or closing operations of the left-side and right-side entry doors.

Referring now to FIG. 7, an exemplary embodiment of a method 700 for reconfiguring an aircraft lavatory complex 200, 200a-d for use by a passenger of reduced mobility (PRM) according to the inventive concepts disclosed herein may be implemented in some embodiments, and may include one or more of the following steps.

At a step 702, an enlarged entry/egress space is created by accessing a left-side lavatory unit of the aircraft lavatory complex via a left-side entry door and a right-side lavatory unit of the aircraft lavatory complex via a right-side door, the left-side and right-side lavatory units being adjacent to one another and separated by a central partition within the entry space. For example, in embodiments the left-side and right-side entry doors may be opened in opposing directions.

At a step 704, a first latch securing the central partition to the aircraft lavatory complex may be unlatched from within the right-side lavatory unit.

At a step 706, a second latch securing the central partition to the aircraft lavatory complex may be unlatched from within the left-side lavatory unit. For example, the second latch (and the first latch indicated above) may removably secure the central partition to a shared floor of the aircraft lavatory complex.

At a step 708, the central partition may be repositioned to enlarge the right-side lavatory unit (e.g., for use by a PRM) while partially or fully obscuring the left-side lavatory unit. For example, the central partition may be repositioned to obscure the toilet of the left-side lavatory unit.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An aircraft lavatory complex, comprising:

a forward wall configured for facing a passenger cabin of an aircraft;

a left-side door and a right-side door set into the forward wall, the left-side door adjacent to the right-side door, the left-side door and the right-side door configured to open in opposing directions;

a left-side lavatory unit accessible via the left-side door and a right-side lavatory unit accessible via the right-side door; and a partition repositionable between a default position and at least one deployed position and held in the default position by at least one left-side latch and at least one right-side latch coupling the partition to the lavatory complex, the partition configured for:

separating the left-side lavatory unit and the right-side lavatory unit when in the default position; and enlarging one of the left-side lavatory unit and the right-side lavatory unit when in the deployed position;

the at least one left-side latch configured to be operated from the left-side lavatory unit and not extending through the partition into the right-side lavatory unit, and the at least one right-side latch configured to be operated from the right-side lavatory unit and not extending through the partition into the left-side lavatory unit, to reposition the partition between the default position and the deployed position.

2. The aircraft lavatory complex of claim 1, wherein the lavatory complex is couplable to a galley structure of the aircraft, further comprising:
a rear wall opposite the forward wall, the rear wall configured to face into the galley structure.

3. The aircraft lavatory complex of claim 2, further comprising:
at least one deployable workdeck coupled to the rear wall, the workdeck configured for deploying into a substantially horizontal position within the galley structure.

4. The aircraft lavatory complex of claim 2, further comprising:
at least one display unit set into the rear wall, the display unit including at least one of a video monitor, a flight attendant panel, and an inflight entertainment (IFE) unit.

5. The aircraft lavatory complex of claim 2, further comprising:
at least one storage bay set into the rear wall, the storage bay configured to accept a standard unit container.

6. The aircraft lavatory complex of claim 2, further comprising:
at least one trolley bay set into the rear wall, the trolley bay configured to removably secure a trolley therewithin.

7. The aircraft lavatory complex of claim 1, wherein the partition is configured for enlarging the left-side lavatory unit by obscuring a portion of the right-side lavatory unit when in the deployed position.

8. The aircraft lavatory complex of claim 7, wherein:
the right-side lavatory unit comprises a toilet and a sink; and
the partition is configured, when in the deployed position, to obscure the toilet but not the sink.

9. The aircraft lavatory complex of claim 1, wherein the partition is configured to be temporarily removed from the aircraft lavatory complex.

10. The aircraft lavatory complex of claim 1, wherein:
each of the at least one left-side latch and the at least one right-side latch comprises a slot, the left-side latch or right-side latch configured to be operated by the insertion of a tool into the slot to actuate the left-side or right-side latch.

11. A method for reconfiguring an aircraft lavatory complex for use by a passenger of reduced mobility (PRM), comprising:

creating an entry space by accessing a left-side lavatory unit via a left-side door and a right-side lavatory unit via a right-side door, the right-side lavatory unit directly adjacent to the left-side lavatory unit and separated from the left-side lavatory unit by a partition at least partially within the entry space;

unlatching at least one left-side latch from within the left-side lavatory unit, the at least one left-side latch coupling the partition to the left-side lavatory unit, the at least one left-side latch set into the partition but not extending through the partition to the right-side lavatory unit;

unlatching at least one right-side latch from within the right-side lavatory unit, the at least one right-side latch coupling the partition to the right-side lavatory unit, the at least one right-side latch set into the partition but not extending through the partition to the left-side lavatory unit; and enlarging the left-side lavatory unit by repositioning the partition.

12. The method of claim 11, wherein creating an entry space by accessing a left-side lavatory unit via a left-side door and a right-side lavatory unit via a right-side door includes:

accessing the left-side lavatory unit by opening the left-side door in a first direction; and accessing the right-side lavatory unit by opening the right-side door in a second direction opposite the first direction.

13. The method of claim 11, wherein enlarging the left-side lavatory unit by repositioning the partition includes:
enlarging the left-side lavatory unit by repositioning the partition to obscure a portion of the right-side lavatory unit.

14. The method of claim 13, wherein enlarging the left-side lavatory unit by repositioning the partition to obscure a portion of the right-side lavatory unit includes:
repositioning the partition to obscure a toilet of the right-side lavatory unit.

15. The method of claim 11, wherein:
unlatching at least one left-side latch from the left-side lavatory unit, the at least one left-side latch coupling the partition to the left-side lavatory unit, the at least one left-side latch set into the partition but not extending through the partition to the right-side lavatory unit, includes unlatching at least one left-side latch coupling the partition to a common floor; and unlatching at least one right-side latch from the right-side lavatory unit, the at least one right-side latch coupling the partition to the right-side lavatory unit, the at least one right-side latch set into the partition but not extending through the partition to the left-side lavatory unit, includes unlatching at least one right-side latch coupling the partition to the common floor.

16. The method of claim 11, wherein enlarging the left-side lavatory unit by repositioning the partition includes:
removing the partition from the aircraft lavatory complex.

* * * * *